No. 883,697. PATENTED APR. 7, 1908.
F. CHAPMAN.
ANIMAL HOLDER.
APPLICATION FILED NOV. 23, 1907.

Witnesses
Georgiana Chase
Palmer Jones

Inventor
Franklin Chapman
By Luther V. Moulton
Attorney.

UNITED STATES PATENT OFFICE.

FRANKLIN CHAPMAN, OF VANDALIA, MICHIGAN.

ANIMAL-HOLDER.

No. 883,697.   Specification of Letters Patent.   Patented April 7, 1908.

Application filed November 23, 1907. Serial No. 403,563.

*To all whom it may concern:*

Be it known that I, FRANKLIN CHAPMAN, a citizen of the United States of America, residing at Vandalia, in the county of Cass and State of Michigan, have invented certain new and useful Improvements in Animal-Holders; and I do hereby declare the following to be a full, clear, and exact description of the invention, such as will enable others skilled in the art to which it appertains to make and use the same.

My invention relates to improvements in animal holders, and more particularly to devices for securely holding animals for veterinary surgical operations of any kind, and its object is to provide the same with various new and useful features hereinafter more fully described and particularly pointed out in the claims.

Figure 1:
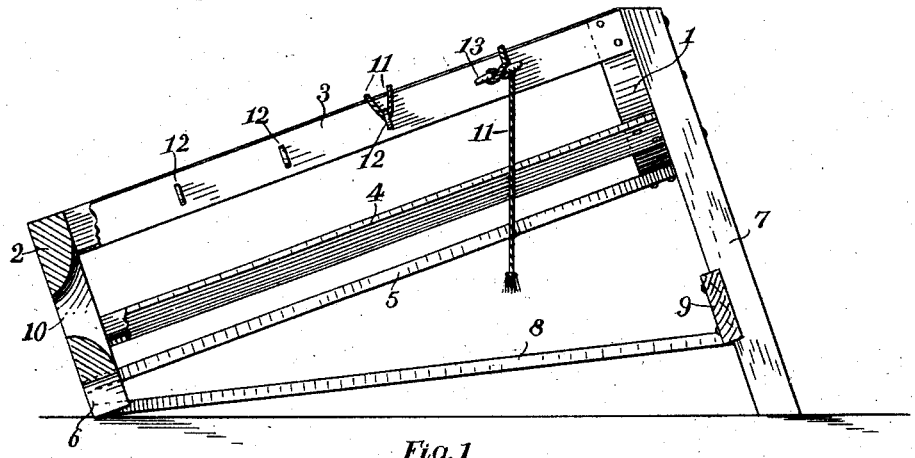
Figure 2:
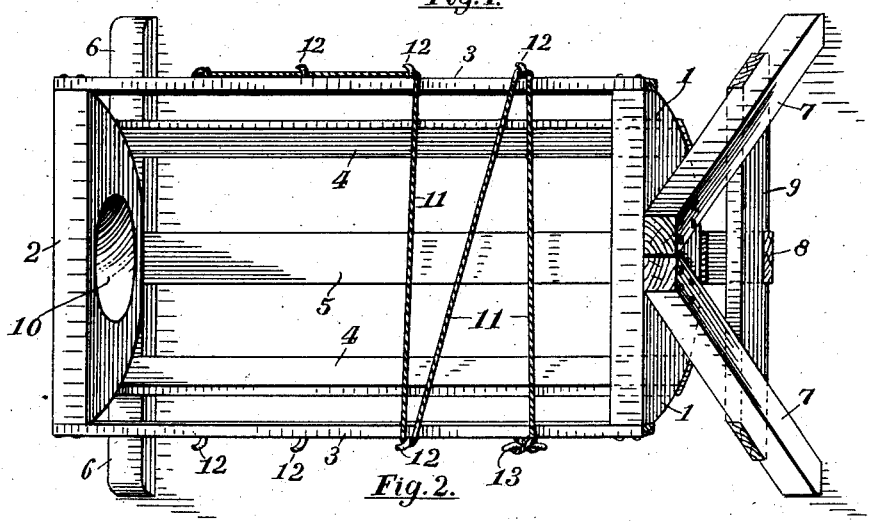
Figure 3:
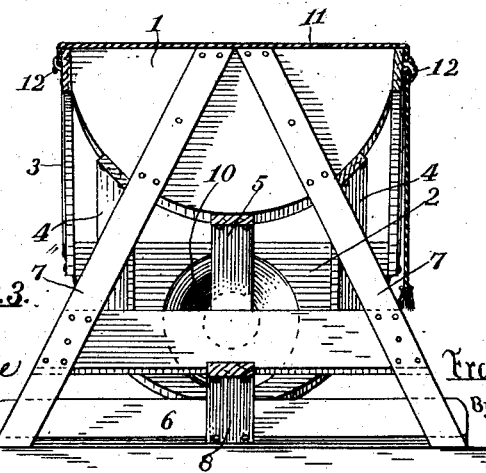

My device consists essentially of a trough-shaped structure supported in an inclined position, the lower head thereof being provided with an opening to receive the nose of the animal, and means for securing the animal within the said structure, as will more fully appear by reference to the accompanying drawings, in which:

Figure 1. is a side elevation of a device embodying my invention with parts broken away to show the construction. Fig. 2. a plan view of the same complete; and, Fig. 3. an end elevation of the same.

Like numbers refer to like parts in all of the figures.

1 represents the upper head and 2 the lower head of the concave trough-shaped structure, to which heads are attached a series of longitudinal slats or strips 3, 4, and 5, the strips 3 being attached near the upper corners of the heads and forming the sides, the strip 5 attached at the bottom, and the strips 4 attached intermediate between the strips 3 and 5. A greater or less number of strips may be used as preferred.

Below the lower head is a transverse sill 6, supporting the same, and the upper head is supported in a more elevated position by legs 7, which are secured to the head at their upper ends and extending in diverging directions downward are supported and strengthened by a cross bar 9 connecting the same and a longitudinal bar 8 connecting the cross bar and the sill 6. The lower head 2 is provided with a funnel-shaped opening 10 therethrough to receive the nose of the animal and hold the same, and thus the head operates as a muzzle, and to further secure the animal in place, a cord or rope 11 is provided which is attached at one end to one of the upper slats 3 and is laced across above both upper slats 3 from side to side of the structure and secured by engagement with hooks 12 located at intervals in the slats 3, with its free end detachably secured to a cleat 13. An animal can thus be placed in this device either upon its back with the nose in the opening 10 and the legs secured by the cord or rope 11 for any surgical operation that may be desirable, or said animal can be placed with the legs extending between the slats 4 and 5 and secured in like manner with its nose in the opening 10 and the cord 11 laced across the back, as occasion may require.

What I claim is:

1. An animal holder comprising semi-circular heads, one head having an opening to receive the nose of an animal, and thus adapted to operate as a muzzle, a series of slats connecting the heads and spaced apart, and means for supporting the described structure in an inclined position.

2. An animal holder comprising two heads of convex lower outline, one of said heads having a funnel shaped opening to receive the nose of an animal and hold the same, a series of slats connecting the heads, a cord attached to one of the upper slats, a series of hooks in the respective upper slats and adapted to engage and hold the cord and means for securing the free end of the cord.

3. An animal holder, comprising semi-circular heads, a series of slats connecting the heads, a sill supporting the lower head, legs supporting the upper head at an elevation above the lower head, a cord attached to one of the upper slats, hooks in the upper slats to engage the cord, and a cleat to secure the free end of the cord.

4. An animal holder, comprising two semi-circular heads, one of which heads is provided with a funnel-shaped opening, a series of slats connecting said heads and spaced apart at intervals, legs supporting the upper head at an elevation above the lower head, a cord attached at one end to one of the upper slats, hooks in the respective upper slats to engage the cord, and a cleat to secure the free end of the cord.

In testimony whereof I affix my signature in presence of two witnesses.

FRANKLIN CHAPMAN.

Witnesses:
JOEL J. NASH,
G. R. CLEMENS.